United States Patent [19]

Dees, Sr. et al.

[11] 4,131,876
[45] Dec. 26, 1978

[54] PNEUMATIC TIRE PRESSURE MONITOR

[76] Inventors: Barry N. Dees, Sr.; Barry N. Dees, Jr., both of Rte. 2, Box 321D, Midlothian, Tex. 76065

[21] Appl. No.: 795,322

[22] Filed: May 9, 1977

[51] Int. Cl.² .............................................. B60C 23/04
[52] U.S. Cl. .................................... 340/58; 200/61.25; 200/83 A; 200/83 J; 116/34 R
[58] Field of Search ............. 340/58; 200/81 R, 81.5, 200/83 R, 83 A, 83 J, 61.22, 61.25; 116/34 R

[56] References Cited

U.S. PATENT DOCUMENTS

| | | | |
|---|---|---|---|
| 1,270,073 | 6/1918 | Thiem | 116/34 |
| 2,463,335 | 3/1949 | Warnshuis et al. | 340/58 X |
| 2,860,321 | 11/1958 | Strickland | 340/58 |
| 2,966,658 | 12/1960 | O'Neill | 340/58 |
| 3,016,515 | 1/1962 | Summers | 340/58 |
| 3,129,690 | 4/1964 | Nygard | 116/34 |
| 3,178,686 | 4/1965 | Mills | 340/58 |
| 3,398,398 | 8/1968 | Johnson | 340/58 |
| 3,533,063 | 10/1970 | Garcia | 340/58 |
| 3,601,080 | 8/1971 | Nygard | 116/34 |
| 3,618,630 | 11/1971 | Marcaccio | 137/227 |
| 3,652,984 | 3/1972 | Jordan et al. | 340/58 |
| 3,662,703 | 5/1972 | Jackson | 116/34 |
| 3,680,523 | 8/1972 | Gaskins | 116/34 |
| 3,713,092 | 1/1973 | Ivenbaum | 340/58 |
| 3,719,159 | 3/1973 | Davis | 116/34 |
| 3,723,966 | 3/1973 | Mueller | 340/58 |
| 3,786,413 | 1/1974 | Ross | 340/58 |
| 3,796,990 | 3/1974 | Hill | 340/58 |
| 3,805,229 | 4/1974 | Murphy | 340/58 |
| 3,806,869 | 4/1974 | Davis | 340/58 |
| 3,806,905 | 4/1974 | Strenglein | 340/224 |
| 3,810,090 | 5/1974 | Davis | 340/58 |
| 3,812,458 | 5/1974 | Hill | 340/58 |
| 3,818,435 | 6/1974 | Hill | 340/58 |
| 3,835,451 | 9/1974 | Church | 340/58 |
| 3,911,434 | 10/1975 | Cook | 343/6.5 R |
| 3,930,223 | 12/1975 | Tsagas | 340/58 |
| 3,938,078 | 2/1976 | Davis | 340/58 |
| 3,950,726 | 4/1976 | Fujikawa | 340/58 |

Primary Examiner—Alvin H. Waring
Attorney, Agent, or Firm—Richards, Harris & Medlock

[57] ABSTRACT

A pneumatic tire pressure monitor for a tandem set of tires has a housing for being affixed to the outboard tire wheel. The housing includes a first and second chamber communicating with the interior pressure of each pneumatic tire of the tandem set of tires. The housing further includes a third chamber containing hydraulic fluid for maintaining a reference level of pressure. A diaphragm is responsive to pressure differentials between the first and second chambers and the third chamber to activate a latch. The latch releases a visual signal member, which moves from a retracted position within the housing to an extended position in order to signal a drop in pressure in either or both of the tires. In an alternate embodiment, the monitor may be used to monitor the pressure of a single pneumatic tire.

31 Claims, 5 Drawing Figures

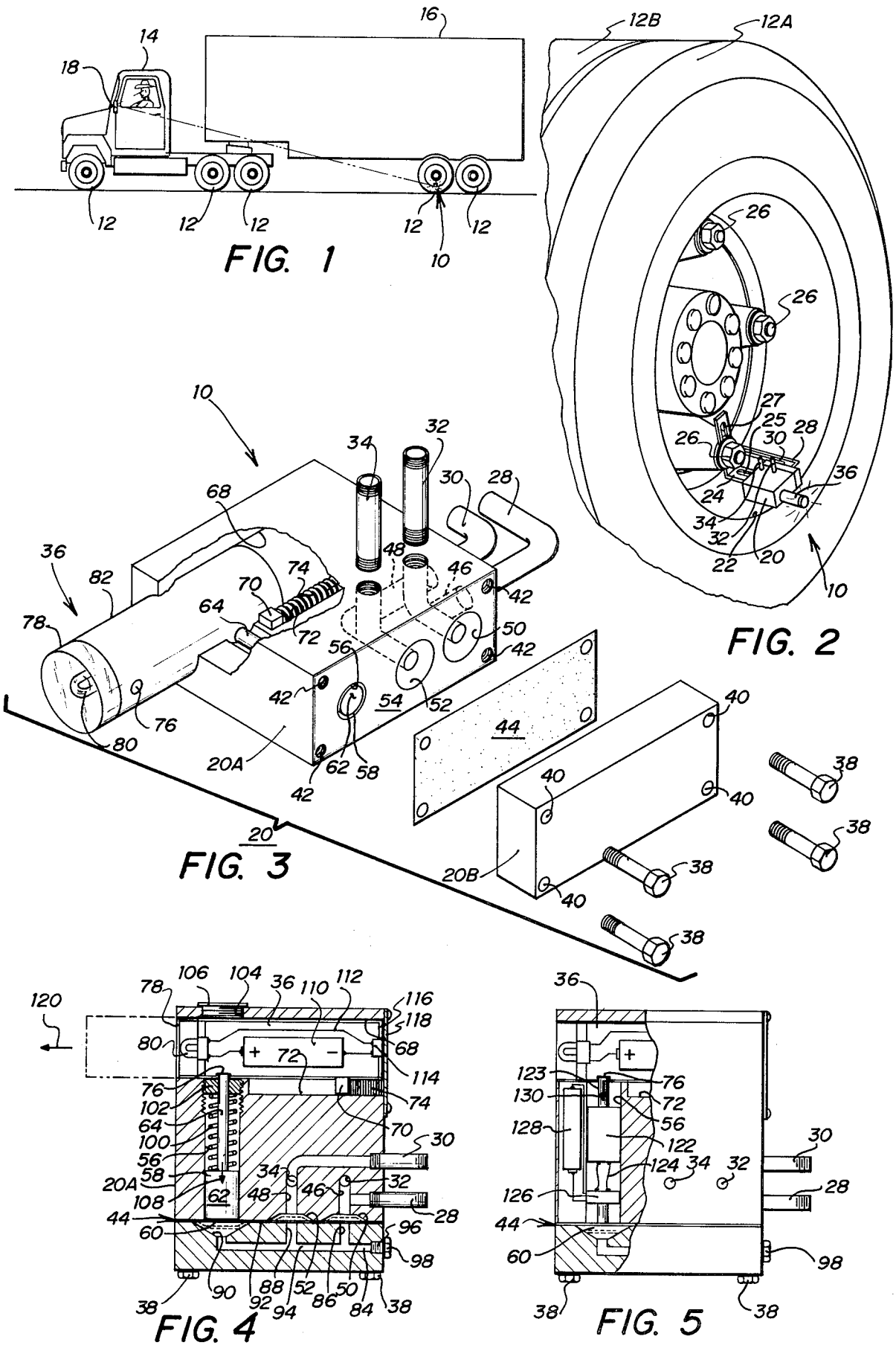

PNEUMATIC TIRE PRESSURE MONITOR

FIELD OF THE INVENTION

This invention relates to pneumatic tire pressure monitoring devices, and more particularly relates to an air pressure monitor for a pneumatic tire which produces a visual signal for the operator of a vehicle when the tire pressure in the monitored tire drops below a predetermined level of pressure.

DESCRIPTION OF THE PRIOR ART

It is a well known fact that a vehicle operating with an underinflated pneumatic tire will wear unevenly, causing premature loss of tread and resulting in increased tire replacement costs to the operator of the vehicle. In addition, underinflated tires result in increased gasoline consumption and poor gas mileage. The significant reduction in vehicle operating costs resulting from maintaining pneumatic tires at the proper level of inflation is important to the operator of any vehicle, but it is particularly important to the operators of large trucks and tractor trailer rigs where the replacement costs of truck tires can be a significant expense item to the operator. It is thus common for truck drivers to periodically stop their trucks and check each of the truck tires for under inflation. This of course is not desirable because of the resulting time loss and inconvenience.

Because of the increased economy and efficiency which results from maintaining pneumatic tires at a proper level of inflation, many attempts have been made to devise a signal system to alert the operator of a vehicle when a tire has a drop in air pressure from a predetermined setting. Many of these systems require the use of complicated radio equipment for transmitting a signal from a monitored tire to the cab of a truck to signal a drop in tire pressure. Examples of such radio systems are described in U.S. Patent No. 3,178,686, U.S. Patent No. 3,533,063, and U.S. Patent No. 3,810,090. Besides being expensive, such systems require compatible equipment in the tractor and trailer of a monitored vehicle, which often results in the system not being used when a trailer equipped with the transmitting unit is not connected to a tractor with the compatible radio receiver units.

Other signalling systems have included mechanical devices attached to a tire for monitoring the imbalance in air pressure occurring between a tandem set of tires. Examples of such systems are described in U.S. Patent No. 3,129,690, U.S. Patent No. 3,601,080, U.S. Patent No. 3,618,630 and U.S. Patent No. 3,938,078. However, such devices fail to indicate an underinflated condition if both monitored tires simultaneously experience the same or nearly the same loss of air pressure. Many prior mechanical tire monitoring devices have had extensive installation requirements which make it impractical to move the device to another tire, or have used an unprotected light signal which is difficult to see in the daylight and which may be damaged from striking highway debris or may be obscured by dirt, mud or snow while the vehicle is in operation.

A need has thus arisen for an improved pneumatic tire pressure monitoring apparatus which automatically provides a visual signal to the operator of a vehicle upon detecting a drop in tire pressure below a predetermined level in either one or both of a monitored set of tires. In addition, there is a need for a pneumatic tire pressure monitoring device which is easy and inexpensive to install and which is readily movable from one tire or set of tires to another tire or set of tires. Further, a need has arisen for a mechanical tire monitoring device which is protected from road hazards during operation and which is not obscured by dirt, mud, or snow. Such an improved tire monitoring apparatus should also include the capability of easily adjusting the tire pressure level to be monitored.

SUMMARY OF THE INVENTION

The present invention eliminates or substantially reduces the deficiencies noted above in prior monitoring and signalling apparatus for pneumatic tires and provides a relatively inexpensive mechanical apparatus which alerts the operator of a vehicle during day or night operation of a predetermined drop in tire pressure of a monitored tire or set of tires.

In accordance with the present invention, a monitoring housing is positioned on a tire wheel and includes a first chamber for communicating with the interior pressure of the monitored tire. A visual signalling member is mounted in the housing and is movable between an extended alarm position and a normal retracted position. An actuator releasably secures the visual signalling member within the housing in the normal retracted position. A second chamber is formed in the housing for maintaining a predetermined reference level of pressure, and a diaphragm is disposed to sense the pressure differential between the chambers. The actuator is responsive to the diaphragm for releasing the visual signalling member to move to an extended position to signal a predetermined drop in pressure within the pneumatic tire.

In accordance with another aspect of the invention, a pneumatic tire monitoring apparatus is provided to detect a predetermined drop in tire pressure in one or both tires of a tandem set of tires. The apparatus includes a housing positioned on a tire wheel, the housing including a first chamber for communicating with the interior pressure of a first monitored pneumatic tire and a second chamber for communicating with the interior of a second pneumatic monitored tire. A third chamber is formed in the housing for maintaining a predetermined reference level of pressure, and a diaphragm is responsive to pressure differentials occurring between either the first and third chamber or the second and third chambers. A visual signalling member is mounted in the housing and is movable between an extended signalling position and a normal retracted position. An actuator is responsive to the diaphragm for releasing said visual signalling member for movement to the extended signalling position to signal the operator that a predetermined drop in pressure has occurred within either one or both of the monitored pneumatic tires.

BRIEF DESCRIPTION OF THE DRAWINGS

For a more complete understanding of the present invention and further objects and advantages thereof reference is now made to the following description taken in conjunction with the following drawings:

FIG. 1 is a side view of a tractor trailer rig installed with the preferred embodiment of the new invention;

FIG. 2 is a perspective view of the preferred embodiment of the invention mounted on a tandem set of pneumatic tires;

FIG. 3 is a partially broken away exploded view of the preferred embodiment of the invention;

FIG. 4 is a phantom plan view of the preferred embodiment of the invention; and

FIG. 5 is a partial phantom plan view of an alternate embodiment of the invention.

DESCRIPTION OF THE PREFERRED EMBODIMENT

FIG. 1 illustrates the preferred embodiment of the pneumatic tire pressure monitoring apparatus of the present invention, generally identified by the numeral 10, shown installed on one set of the tires 12 of a tractor 14 connected to a trailer 16. The monitoring apparatus 10 is mounted on the tires 12 in such a manner that the apparatus may be readily seen by the operator of the tractor 14 through the rearview mirrors 18 of the tractor. Although the present apparatus 10 is shown installed on only one set of tires for ease of description, it will be understood that normally the apparatus 10 would be installed on each set of wheels. The monitoring apparatus 10 includes a visual signalling member 36 which may be seen by the operator only when a predetermined pressure loss has occurred in the associated tire set.

FIG. 2 is a perspective view of the tire monitoring apparatus 10 installed and positioned on the outboard tire 12A of a tandem set of truck tires 12A and 12B. The monitoring apparatus 10 includes a housing 20 positioned in alignment with the exterior portion of the tire rim 22 by means of an L-shaped bracket 24 secured by a lug nut 26 to the tire 12A. A slot 25 is formed within one portion of said bracket 24 for adjustably positioning housing 20 on the exterior portion of tire rims 22 of different widths. In addition, a slot 27 is formed within the outer portion of bracket 24 for adjustably positioning the housing 20 to tires 12 of different diameters. The monitoring apparatus 10 may be selectively secured to any of the lug nuts 26 of the tire 12, acting as a counterweight in balancing the tire 12 to provide for maximum tread wear.

The housing 20 of the monitoring apparatus 10 has air passageways 28 and 30 connecting the interior pressure of tires 12A and 12B, respectively, to the interior of the housing 20. The housing 20 further includes valve stems 32 and 34 for connecting the interior pressures of tires 12A and 12B, respectively, to an exterior source of pressure for maintaining the correct level of inflation in tires 12A and 12B. In FIG. 2, the housing 20 is illustrated with the elongated visual signalling member 36 in an extended position which may readily be seen by the operator of tractor 14 in the rearview mirrors 18. The visual signalling member 36 may include a light source, or may be provided with a bright color, to facilitate viewing by the vehicle operator. The mounting of the apparatus 10 on the outer periphery of the wheels further assists in viewing by the operator due to the large span of movement of the visual signalling member 36.

FIG. 3 is an exploded view, partially broken away, illustrating a housing 20 of the monitoring apparatus 10. The housing 20 comprises a first housing member 20A attached to a second housing member 20B by means of a plurality of threaded bolts 38 passing through passageways 40 of housing member 20B and received within threaded openings 42 of the first housing member 20A. A diaphragm 44 is closely fitted between first housing member 20A and second housing member 20B and held in place by the fastening bolts 38. The diaphragm 44 may consist of any suitable fluid impermeable flexible substance, but it has been found in practice that a sheet of 1/32 inch thick rubber operates as a suitable diaphragm.

The first housing member 20A includes a pair of chambers 46 and 48 which communicate with the interior pressure of tires 12A and 12B, respectively, through their respective air passageways 28 and 30. It is to be understood, of course, that housing member 20A may include only one chamber for communicating with the interior pressure of a tire, when the monitoring apparatus 10 is intended for use on a single tire 12.

Chambers 46 and 48 extend to recessed cavities 50 and 52, respectively, formed in the outer wall 54 of housing member 20A facing diaphragm 44. Valve stems 32 and 34 are connected through outside openings in the housing member 20A to the interior of chambers 46 and 48, respectively. The valve stem members 32 and 34 include conventional one-way air valves and provide a convenient means for reading the internal air pressure of either one of the tires 12A and 12B of the tandem set of tires and for inflating or deflating said tires to obtain the optimum tire pressure setting.

As shown in FIGS. 3 and 4, an aperture 56 is formed in the housing member 20A for receiving therein a spring biased plunger 58. The aperture 56 extends to an opening 60 in the outer wall 54 closely adjacent the diaphragm 44. The plunger 58 includes a piston portion 62, normally disposed flush with the outer wall 54 and adjacent the diaphragm 44, and a rod portion 64 for releasably securing the visual signalling member 36.

The visual signalling member 36 is mounted for movement within a circular passageway 68 of housing member 20A and includes a key 70 which is received within a key slot 72 of the housing member 20A. Spring 74 is disposed in slot 72 and abuts against key 70. The member 36 is thus slidably movable from a normal fully retracted position to a fully extended signal position under the action of spring 74 against key 70. In the fully retracted position, the signalling member 36 is protected from various road hazards, including breakage from striking highway debris and obstruction from dirt, mud or snow. In the normal retracted position, visual signalling member 36 is retained by the rod portion 64 of the spring loaded plunger 58 which engages a notch 76 formed within the visual signalling member 36. In the retracted position, spring 74 is compressed.

Visual signalling member 36 further includes a lens covering 78 protecting a lamp 80 contained therein. The visual signalling member 36 also includes a cylindrical wall 82 having a distinctive coloring to attract the driver's attention to the extended signal, thereby indicating a loss in pressure in one or both of the monitored tires below a predetermined level. The exterior wall 82 of the signalling member 36 may be constructed of any suitable translucent plastic material distinctively colored and illuminated from within by the lamp 80 to be visible during the day or night.

FIG. 4 is a sectioned plan view of the preferred embodiment of the invention. The housing member 20B includes a central chamber 84 extending to non-recessed openings 86, 88, and recessed opening 90 formed within an outer wall 92. The diameter of openings 86 and 88 is less than the diameter of the recessed openings 50 and 52. When housing member 20B is connected to housing member 20A, openings 86 and 88 are positioned adjacent corresponding recessed openings 50 and 52 formed within outer wall 54. The non-recessed openings 86 and 88 prevent the overinflation of one of the monitored tires 12A or 12B from affecting the detection of the underinflation of the other tire. Recessed opening 90 is positioned adjacent opening 60 of passageway 56 formed within housing member 20A. The diaphragm 44 separates openings 86, 88 and 90 from openings 50, 52 and 60.

The housing member 20B has its exterior wall 92 securely fitted against diaphragm 44 which seals against adjacent outer wall 54 of housing member 20A. A hydraulic fluid 94 is introduced into the central chamber 84 and the openings 86, 88 and 90 of member 20B through an opening 96 in an exterior wall of the housing member 20B. The reference level of pressure within the chamber 84 may be adjusted with a threaded plug 98. Although a hydraulic fluid is preferred, air may be used in chamber 84 if a suitable seal is provided at plug 98.

The spring biased plunger 58 fitted for movement within the channel 56 includes a spring 100 which may be adjusted in tension by an annular screw 102 threadedly received within the chamber 56. An opening 104, closed in normal operation by a threaded plug 106, is provided in an exterior wall of housing member 20A to provide access to the adjustable screw 102. Adjustment of screw 102 provides means for regulating the drop in pressure within chambers 46 or 48 which causes spring biased plunger 58 to move to its extended position in the direction of arrow 108.

The lamp 80 within signalling member 36 is energized by a battery 110 through circuitry 112 which includes a pressure switch 114. The pressure switch 114 is located at the base 116 of the signalling means 36 and is retained in its normally open position by pressure against a closing plate 118. The plunger 58 prevents movement of the signalling means 36 by the rod portion 64 extending into the notch 76 of the signalling member 36. Outward movement of the signalling member 36 to its fully extended position closes pressure switch 114 and energizes the lamp 80 to provide an illuminated signal.

FIG. 5 is a partially broken away plan view of an alternate embodiment of the pneumatic tire monitoring apparatus 10. In this alternate embodiment of the invention, a solenoid 122 replaces the spring biased plunger 58 within the aperture 56 of housing member 20A. Solenoid 122 has an armature 123 received within the notch 76 of visual signalling means 36, thereby retaining the signalling means 36 in its retracted position within housing member 20A. Solenoid 122 is connected by circuitry 124 through a pressure switch 126 and energizing battery 128. The pressure switch 126 is maintained in a normally open position through the pressure of adjacent diaphragm 44 at the opening 60 of the passageway 56. Flexing of the diaphragm member 44 to the position shown by the dotted line in FIG. 5 causes pressure switch 126 to close, thereby energizing solenoid 122 and retracting plunger 124 in the direction of arrow 130 to release visual signalling member 36.

In operation of the invention, the housing 20 is positioned by bracket 24 to a lug nut 26 of a tandem set of tires 12A and 12B. The housing 20 is normally positioned adjacent the edge of the tire rim 22 of a monitored tire 12.

Visual signalling member 36 is initally set in its normal retracted position by pushing the signalling means 36 down into chamber 68 until rod portion 64 of the spring biased plunger 58 engages the notch 76. The pressure switch 114 is then opened and spring 74 is compressed for extending the signalling member 36 when it is released by the spring biased plunger 58.

The hydraulic fluid 94 within the second housing member 20B is normally preset at a reference pressure level equivalent to that of the desired inflation level of tires 12A and 12B. The pressure within the central chamber 84 of housing member 20B may be adjusted by advancing or retracting threaded bolt 98.

When the monitored tires 12A and 12B are at the desired pressure setting, the diaphragm 44 is thus maintained in an unflexed position and spring biased plunger 58 maintains the visual signalling member 36 in its normally retracted position. A drop in pressure in one or both of the monitored tires 12A and 12B will cause diaphragm 44 to be depressed within either cavity 50 or 52 of the housing member 20A, thereby causing a corresponding opposite deflection of the diaphragm 44 within the opening 90 of housing member 20B. For example, when the pressure in tire 12A drops a predetermined pressure increment, such as four lbs. psi, the pressure of the hydraulic fluid 94 within housing member 20B causes diaphragm 44 to flex inwardly within cavity 50, as shown by the broken line in FIG. 4. This deflection of diaphragm 44 causes a corresponding inwardly deflection of the diaphragm 44 within opening 90 to compensate for the expansion of hydraulic fluid 94 into the recesses of cavity 50. The inward deflection of the diaphragm 44 is shown by dotted lines in FIG. 4.

Spring biased plunger 58 is thus allowed to travel in the direction of arrow 108 into the recessed opening 90 of housing member 20B. The rod 64 is withdrawn from the notch 76 of visual signalling member 36, thereby allowing member 36 to extend outwardly under the action of spring 74 against key 70. The visual signalling member 36 travels outwardly until the key 70 reaches the end of the key guide way 72. The outward movement of the signalling member 36 in the direction of arrow 120 causes the normally open pressure switch 114 to close, thereby lighting the lamp 80 and illuminating the signalling member 36.

Similarly, a drop in pressure within the interior of tire 12B, or a simultaneous drop in pressure in tires 12A and 12B, will cause an inward deflection of the diaphragm 44 within cavities 50 and/or 52. Such inward deflection causes the hydraulic fluid within housing member 20B to expand into housing member 20A, causing a corresponding opposite flexing of diaphragm 44 within cavity 90 of housing member 20B.

Operation of the embodiment of FIG. 5 is similar to that described above for FIG. 4, except that the solenoid 122 replaces the plunger 58 as the activator for releasably securing visual signalling member 36.

The present invention offers distinct advantages over those prior art devices which monitor only an imbalance between a set of tires, because the present invention is able to detect a simultaneous pressure loss in a tandem set of tires as well as a drop in pressure of either tire. The present invention may be readily adapted to monitor the tire pressure of a single tire by simply eliminating the chamber 48 formed within the housing member 20A.

The monitoring apparatus of the present invention thus detects a loss in pressure in either one or both of a tandem set of tires and provides a visual signalling member extending from the rim 22 of the monitored tire 12 which is readily visible in the rearview mirror of a tractor trailer rig. Upon detecting the low tire pressure signal, the operator of the vehicle may return the tire to its proper level of inflation and reset the visual signalling member 36.

It will be understood that the housing members 20A and 20B may be constructed of any suitable material, but preferably uses a lightweight metal such as aluminum. It will be further understood that the elongated visual signalling member may vary in shape, and be made of a translucent or opaque material.

Although the preferred embodiments of the invention have been illustrated in the accompanying drawings and described in the foregoing detailed description, it will be understood that the invention is not limited to the embodiments disclosed, they are capable of numerous rearrangements, modifications, and substitutions of parts and elements without departing from the spirit of the invention.

What is claimed is:

1. A monitoring apparatus for detecting a predetermined drop in the pressure of a pneumatic tire mounted on a vehicle comprising:
   a housing for being positioned on a tire wheel and including a first chamber for communicating with the interior pressure of the pneumatic tire,
   visual signalling means mounted in said housing and movable between a retracted position and an extended position visible to the operator of the vehicle,
   actuator means for releasably securing said signalling means within said housing member in said retracted position,
   a second chamber formed in said housing for maintaining therein a predetermined reference level of fluid pressure,
   diaphragm means responsive to the pressure differentials between said first and second chambers, and
   said actuator means responsive to said diaphragm means for releasing said visual signalling means for movement to said extended position to signal a predetermined drop in pressure within the pneumatic tire.

2. The monitoring apparatus of claim 1 and further comprising valve means for communicating said first chamber and the interior pressure of a tire to an external source of pressure.

3. The monitoring apparatus of claim 1 wherein said visual signalling means includes a spring driven key attached to said signalling means and received within a channel formed in said housing for movement of said signalling means from a normally retracted position to an extended signal position visible to the operator of the vehicle.

4. The monitoring apparatus of claim 1 wherein said visual signalling means comprises an elongated member retained inside said housing in the normally retracted position such that said visual signalling means is protected from road hazards and said elongated member extending from said housing upon release by said actuator means sufficiently beyond the tire wheel to be visible to the operator of the vehicle.

5. The monitoring apparatus of claim 4 wherein said elongated visual signalling member further includes:
   a lamp disposed at the end of said elongated member extending from said housing,
   a battery for energizing said lamp,
   circuitry for connecting said battery to said lamp, and
   a pressure sensitive switch normally open when said visual signalling means is in the retracted position and closed when said signalling means is in the extended position, whereby said lamp is illuminated in the extended position to provide a visual signal to the operator of the vehicle.

6. A monitoring apparatus of claim 1 wherein said actuator means comprises:
   a spring biased plunger mounted for movement within an aperture formed within said housing, one end of said plunger engaging said visual signalling means to prevent movement of said signalling means, the opposite end of said plunger engaging a portion of said diaphragm means opposite an opening to said second chamber, such that movement of said diaphragm means responsive to a change in the pressure differential between said first and second chambers causes said spring biased plunger to release said visual signalling means.

7. The monitoring apparatus of claim 6 wherein said spring biased plunger includes means for adjusting the spring tensioning of said plunger.

8. The monitoring apparatus of claim 1 wherein said diaphragm means comprises a sheet of fluid impermeable flexible material.

9. The monitoring apparatus of claim 1 wherein said diaphragm means moves from an unflexed position to a position flexed inward towards said first chamber and outwards towards said second chamber in response to a drop in pressure below a predetermined level in the monitored tire.

10. The monitoring apparatus of claim 1 wherein said second chamber includes means for adjusting the predetermined level of pressure within said second chamber.

11. The monitoring apparatus of claim 1 and further comprising L-shaped bracket means for positioning said housing on a tire wheel, said bracket means having a first portion attached by a lug nut to the tire wheel and a second portion attached to said housing.

12. The monitoring apparatus of claim 11 wherein said L-shaped bracket means includes a first slot formed within said first portion of said bracket means, such that said housing may be adjustably positioned on tire wheels having different diameters, and a second slot formed within said second portion of said bracket means, such that said housing may be adjustably positioned on tires having rims of different width.

13. The monitoring apparatus of claim 1 and including bracket means for positioning said housing on a tire wheel to act as a counterweight in balancing said tire.

14. The monitoring apparatus of claim 1 wherein said actuator means comprises:
   a battery operated solenoid for operating a plunger to releasably secure said visual signalling means and further including a normally open pressure sensitive switch connecting said battery to said solenoid which closes in response to a predetermined loss in pressure in the monitored tire.

15. A monitoring apparatus for detecting a predetermined drop in pressure of one or both tires of a tandem set of tires on a vehicle comprising:
   a housing for being positioned on a tire wheel and including a first chamber for communicating with the interior of a first pneumatic tire and a second chamber for communicating with the interior of a second pneumatic tire,
   visual signalling means mounted in said housing and movable between an extended position and a retracted position, and
   means responsive to a predetermined drop in pressure within one or both of said first and second pneumatic tires for moving said visual signalling means from said retracted position to said extended position visible to the operator of the vehicle.

16. The monitoring apparatus of claim 15 wherein said responsive means comprises:
actuator means for releasably securing said signalling means within said housing member in said retracted position,
a third chamber formed in said housing for maintaining a predetermined reference level of pressure,
diaphragm means responsive to the pressure differentials between said first chamber and third chamber and said second chamber and third chamber, and
said actuator means responsive to said diaphragm means for releasing said visual signalling means for movement to said extended position to thereby signal a predetermined drop in pressure within said first or second pneumatic tire.

17. The monitoring apparatus of claim 15 and further comprising valve means for communicating said first and second chambers to an external source of pressure.

18. The monitoring apparatus of claim 15 wherein said visual signalling means includes a spring driven key attached to said signalling means and received within a channel formed in said housing for movement of said signalling means from a normally retracted position to an extended signal position.

19. The monitoring apparatus of claim 15 wherein said visual signalling means comprises an elongated member retained inside said housing in the normally retracted position such that said visual signalling means is protected from road hazards and said elongated member extending from said housing upon release by said actuator means sufficiently beyond the tire wheel to be visible to the operator of the vehicle.

20. The monitoring apparatus of claim 15 wherein said elongated visual signalling member further includes:
a lamp disposed at the end of said elongated member extending from said housing,
a battery for energizing said lamp,
circuitry for connecting said battery to said lamp, and
a pressure sensitive switch normally open when said visual signalling means is in the retracted position and closed when said signalling means is in the extended position, whereby said visual signalling means is illuminated in the extended position to provide a visual signal to the operator of the vehicle.

21. A monitoring apparatus of claim 16 wherein said actuator means comprises:
a spring biased plunger mounted for movement within an aperture formed within said housing, one end of said plunger engaging said visual signalling means to prevent movement of said signalling means, the opposite end of said plunger engaging a portion of said diaphragm means opposite an opening to said third chamber, such that movement of said diaphragm means responsive to a change in the pressure differential between said first and second chambers causes said spring biased plunger to release said visual signalling means.

22. The monitoring apparatus of claim 21 wherein said spring biased plunger includes means for adjusting the spring tensioning of said plunger.

23. The monitoring apparatus of claim 16 wherein said diaphragm means comprises a sheet of fluid impermeable flexible material.

24. The monitoring apparatus of claim 16 wherein said diaphragm means moves from an unflexed position to a position flexed inward towards either said first chamber or said second chamber and outwards toward said third chamber in response to a drop in pressure below a predetermined level in either one or both of the monitored tires.

25. The monitoring apparatus of claim 6 wherein said third chamber includes means for adjusting the predetermined level of pressure within said third chamber.

26. The monitoring apparatus of claim 15 and including bracket means for positioning said housing on a tire wheel to act as a counterweight in balancing said tire.

27. The monitoring apparatus of claim 16 wherein said actuator means comprises:
a battery operated solenoid for operating a plunger to releasably secure said visual signalling means and further including a normally open pressure sensitive switch connecting said battery to said solenoid which closes in response to a predetermined loss in pressure in the monitored tire.

28. A tire pressure monitoring apparatus for detecting a predetermined loss of air pressure in either one or both of a tandem set of pneumatic tires comprising:
a housing for being positioned on the outboard tire of the tandem set of tires,
said housing including a central body portion and an ancillary body portion, said ancillary body portion being positioned adjacent said central body portion,
said central body portion including a first chamber for communicating with the outboard tire and a second chamber for communicating with the inboard tire,
said first and second chambers extending to first and second openings in an outer wall of said central body portion adjacent an outer wall of said ancillary body portion,
said ancillary body portion including a third chamber containing a hydraulic fluid for maintaining a reference level of pressure,
said third chamber extending to first and second openings formed in said outer wall of said ancillary body portion adjacent said central body portion,
said first and second openings of said ancillary body portions being aligned with said first and second recessed openings of said central body portion,
an elongated visual signalling member mounted in said central body portion for movement between a retracted position and an extended position,
actuator means disposed within an aperture formed within said central body portion for releasably securing said visual signalling member within said central body portion,
said third chamber further extending to a third opening formed in the outer wall of said ancillary body portion adjacent said central body portion, said third opening being aligned with said aperture of said central body portion,
a flexible diaphragm disposed between said first and second chambers of said central body portion and said third chamber of said ancillary body portion, said diaphragm being responsive to pressure differentials occurring between said first chamber and said third chamber and said second chamber and said third chamber, and
said actuator means being responsive to a predetermined drop in pressure in said first or second chamber of said central body portion for releasing said visual signalling member for movement to said extended position.

29. The tire pressure monitoring apparatus of claim 28, wherein said actuator means comprises:
a spring biased plunger received for movement within said aperture of said central body portion, said spring biased plunger including a rod portion for engaging said visual signalling member and a piston portion for being positioned adjacent said diaphragm means, such that a predetermined loss of air pressure in the inboard or outboard tire causes said diaphragm means to flex into said third opening, allowing said plunger to move toward said third opening to release said visual signalling member to move to said extended signalling position.

30. The tire pressure monitoring apparatus of claim 28, wherein said actuator means comprises:
a battery energized solenoid disposed within said aperture of said central body portion, said solenoid including a rod portion for engaging said visual signalling member and a normally open pressure sensitive switch adjacent a portion of said diaphragm covering said third opening, such that a predetermined loss in air pressure in either one or both of the tandem set of tires causes said diaphragm means to move toward said third opening for closing said switch and energizing said solenoid to retract said rod portion to release said visual signalling means to said extended signalling position.

31. The tire monitoring apparatus of claim 28 wherein said first and second openings of said central body portion and said third opening of said ancillary body portion are recessed and said first and second openings of said ancillary body portion are non-recessed, such that said flexible diaphragm flexes within said first or second recessed openings in response to a predetermined drop in pressure in one of the inboard or outboard tires independent of any overinflation of the other one of said tires.

* * * * *